United States Patent
Becker et al.

(10) Patent No.: US 9,618,769 B2
(45) Date of Patent: Apr. 11, 2017

(54) LONG-RANGE OPTICAL DEVICE HAVING IMAGE STABILIZATION

(71) Applicant: Carl Zeiss Sports Optics GmbH, Wetzlar (DE)

(72) Inventors: Kurt Becker, Wettenberg (DE); Christian Bach, Buseck (DE); Georg Guenther, Grosschwabhausen (DE); Dirk Dobermann, Magdala OT Ottstedt (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 198 days.

(21) Appl. No.: 14/330,665

(22) Filed: Jul. 14, 2014

(65) Prior Publication Data

US 2014/0368911 A1 Dec. 18, 2014

Related U.S. Application Data

(63) Continuation of application No. PCT/EP2013/050175, filed on Jan. 8, 2013.
(Continued)

(30) Foreign Application Priority Data

Jan. 13, 2012 (DE) .................... 10 2012 000 857

(51) Int. Cl.
*G02B 27/64* (2006.01)
*G02B 23/18* (2006.01)
*G02B 23/02* (2006.01)

(52) U.S. Cl.
CPC ........... *G02B 27/646* (2013.01); *G02B 23/18* (2013.01); *G02B 27/644* (2013.01); *G02B 23/02* (2013.01)

(58) Field of Classification Search
CPC .... G02B 27/644; G02B 27/646; G02B 23/02; G02B 23/18; G02B 27/64; G02B 27/642; G02B 27/648
(Continued)

(56) References Cited

U.S. PATENT DOCUMENTS 2,688,456 A 8/1949 Jensen
2,829,557 A 1/1950 Jensen
(Continued)

FOREIGN PATENT DOCUMENTS

DE 2244694 A1 3/1973
DE 23 36 867 A1 2/1975
(Continued)

*Primary Examiner* — Bumsuk Won
*Assistant Examiner* — Collin X Beatty
(74) *Attorney, Agent, or Firm* — Muirhead and Saturnelli, LLC

(57) ABSTRACT

A long-range optical device has at least one optical channel, which has a housing and an arrangement of optical elements, wherein at least one of the optical elements is movable relative to the housing for image stabilization in the event of perturbing movements of the housing. The device further has a first passive stabilization system based on mass inertia for the at least one movable optical element, which, in the event of displacement of the at least one optical element relative to the housing, generates a first restoring force proportional to the displacement and a second restoring force proportional to the displacement velocity. The first stabilization system is designed for image stabilization in the event of perturbing movements in a first frequency range. The long-range optical device has at least one second stabilization system, which is coupled to the first stabilization system and is designed for image stabilization against perturbing movements in at least one second frequency
(Continued)

range, wherein the first and the at least one second frequency ranges are at least partially different.

23 Claims, 10 Drawing Sheets

Related U.S. Application Data

(60) Provisional application No. 61/586,321, filed on Jan. 13, 2012.

(58) Field of Classification Search
USPC .......................................... 359/554, 555–557
See application file for complete search history.

(56) References Cited

U.S. PATENT DOCUMENTS

| | | | | |
|---|---|---|---|---|
| 3,728,948 | A * | 4/1973 | Fraser | G03B 31/02 359/557 |
| 3,756,686 | A * | 9/1973 | Humphrey | G02B 27/646 250/201.1 |
| 3,756,687 | A | 9/1973 | Shin et al. | |
| 3,910,693 | A * | 10/1975 | De La Cierva | F16M 13/04 352/244 |
| 4,318,584 | A * | 3/1982 | Ando | G02B 27/646 359/401 |
| 4,417,788 | A | 11/1983 | Alvarez et al. | |
| 4,780,739 | A | 10/1988 | Kawakami et al. | |
| 4,911,541 | A * | 3/1990 | Alvarez | G02B 27/646 359/557 |
| 5,029,995 | A | 7/1991 | Weyrauch et al. | |
| 5,978,600 | A * | 11/1999 | Takeuchi | G02B 27/646 396/53 |
| 6,369,946 | B1 | 4/2002 | Ishijima et al. | |
| 2002/0112543 | A1* | 8/2002 | Noguchi | G03B 5/00 73/618 |
| 2005/0128749 | A1* | 6/2005 | Wilson | G02B 27/20 362/259 |
| 2006/0008263 | A1* | 1/2006 | Kakiuchi | G02B 27/646 396/55 |
| 2008/0136923 | A1* | 6/2008 | Inbar | G02B 27/646 348/208.2 |
| 2009/0303586 | A1* | 12/2009 | Dobermann | G02B 23/00 359/399 |
| 2011/0058799 | A1* | 3/2011 | Chung | G02B 27/646 396/55 |
| 2012/0132709 | A1* | 5/2012 | Lowrey, III | F41C 27/22 235/407 |
| 2013/0193315 | A1* | 8/2013 | Shemesh | G02B 27/644 250/226 |

FOREIGN PATENT DOCUMENTS

| | | |
|---|---|---|
| DE | 3630 385 A1 | 3/1987 |
| DE | 38 43 776 A1 | 7/1990 |
| EP | 0 149 118 A2 | 7/1985 |
| EP | 0 834 761 A1 | 4/1998 |

* cited by examiner

LONG-RANGE OPTICAL DEVICE HAVING IMAGE STABILIZATION

CROSS REFERENCES TO RELATED APPLICATIONS

This application is a continuation of international patent application PCT/EP2013/050175, filed on Jan. 8, 2013 designating the U.S., which international patent application has been published in German language and claims priority from German patent application No. 10 2012 000857.0, filed on Jan. 13, 2012, and from U.S. provisional patent application No. 61/586,321, filed on Jan. 13, 2012. The entire contents of these priority applications are incorporated herein by reference.

BACKGROUND OF THE INVENTION

The invention relates to long-range optical devices. A long-range optical device can be a monocular or binocular telescope in the meaning of the present invention, in particular a pair of binoculars. In the case of a binocular telescope, the long-range optical device has two optical channels.

During the usage of a long-range optical device, for example, a pair of binoculars, perturbing movements of the housing of the long-range optical device have a negative effect on the image quality of the image seen by the user. The perturbing movements acting on the housing result in shaking of the image, which perturb the observation of an object or scenery.

The perturbing movements acting on the housing can have various causes, which differ with respect to their frequency spectrum.

One cause of perturbing movements is the trembling of hands during a freehand usage of the long-range optical device, i.e. a usage without support by a tripod or the like. Perturbing movements which are to be attributed to trembling hands, have a frequency spectrum which comprises frequencies from approximately above 4 to approximately 20 Hz. Perturbing movements in such a frequency range are also referred to in the present description as high-frequency perturbing movements.

A further cause of perturbing movements are external influences, for example, an oscillating or vibrating ground of a land, water, or air vehicle. Such perturbing movements can have a frequency spectrum which lies below the frequency spectrum of trembling hands, i.e. which can contain frequencies below 4 Hz to close to 0 Hz.

Perturbing movements which have a frequency spectrum below approximately 4 Hz are referred to in the present description as low-frequency perturbing movements.

FIG. 1 schematically shows the frequency spectrum of perturbing movements, which can act on a long-range optical device, i.e. on its housing. In FIG. 1, the amplitude A of the perturbing movements is plotted against the frequency f. The low-frequency frequency range is identified with $f_N$ and the high-frequency frequency range is identified with $f_H$. The frequency $f_0$ is to indicate the boundary between the low-frequency frequency range and the high-frequency frequency range here. It is obvious that the frequency $f_0$ does not necessarily have to lie at 4 Hz, but rather can be in a range between approximately 2 Hz and approximately 5 Hz.

Intentional movements of the housing of the long-range optical device are to be differentiated from perturbing movements, i.e. during a pivot of the long-range optical device to cause the view through the long-range optical device to be swept or to track a moving object.

Movably supporting at least one optical element of the arrangement of optical elements so it is movable relative to the housing is known for image stabilization in the event of perturbing movements of the housing. In the long-range optical device known from the document DE 38 43 776 A1, this at least one optical element is the image inversion system. A passive stabilization system based on mass inertia is provided for the image inversion system. The stabilization system has, on the one hand, a spring joint, via which a carrier, to which the image inversion system is fixedly connected, is movably supported so it is movable relative to the housing, and, on the other hand, a damping member, which is implemented as an eddy current damping element and which also acts between the carrier and the housing. The spring joint has two rotational degrees of freedom, specifically one degree of freedom around a horizontal axis of the long-range optical device and one degree of freedom around the vertical axis of the long-range optical device.

The movable supporting and damping of the movement of the image inversion system relative to the housing cause perturbing movements acting on the housing to be transmitted in a reduced manner or not at all to the image inversion system, but rather for this to be held more or less in an idle position, whereby the image which is observed by the user is stabilized.

A passive stabilization system based on mass inertia may be represented according to FIG. 2 by a mechanical equivalent diagram. FIG. 2 shows a mechanical equivalent diagram of a passive stabilization system 200 based on mass inertia for an optical element 202. The optical element 202 is fastened on a carrier 204, which is in turn supported on a bearing 206, wherein a first restoring force 208 proportional to the displacement amplitude of the carrier 204 and a second restoring force 210 proportional to the displacement velocity act on the carrier. In the known long-range optical device, the function of the bearing 206 and the first restoring force 208 are fulfilled by the spring joint and the second restoring force 210 is fulfilled by the eddy current damping member.

In such passive stabilization systems based on mass inertia, it has been shown that they can stabilize the image particularly effectively against perturbing movements in the high-frequency target frequency range. A curve is shown in FIG. 3, which shows the dependence of the degree of stabilization S on the frequency f in the frequency range above 1 Hz of a long-range optical device, as is known from the prior art and which has a passive stabilization system, which is based on mass inertia. As shown in FIG. 3, in the known long-range optical device a degree of stabilization of above 80% is achieved at frequencies above 6 Hz, while the degree of stabilization drops significantly at lower frequencies, in particular 4 Hz or less. In other words, a passive stabilization system based on mass inertia is capable of offering effective image stabilization in the event of perturbing movements such as trembling hands, while effective image stabilization is not provided in the case of perturbing movements such as, for example, low-frequency moving grounds. The stabilization behavior above 1 Hz is not shown in FIG. 3.

The possibility does exist, in the case of a solely passive stabilization system based on mass inertia, to modify the manipulated variables of restoring force proportional to the displacement amplitude and restoring force proportional to the displacement velocity so that effective image stabilization is also made possible in the case of perturbing movements in the low-frequency frequency range. However, this is not desirable in every case, because then in the case of an intended pivot of the long-range optical device, it can occur that the field of vision does not instantaneously follow the pivot movement, which is also referred to as a "panning effect". This effect results in irritation in the observer and would restrict the usage of the image-stabilized long-range optical device.

In contrast, those long-range optical devices are known, for example, from EP 0 834 761 A1, which have an active, electronically controlled stabilization system. Such active, electronic stabilization systems do also permit image stabilization in the event of perturbing movements in the low-frequency frequency range, but have the disadvantage that, on the one hand, they require a very large structural volume and are very costly, and, on the other hand, a current must also flow to operate the actuators, for image stabilization in the event of perturbing movements in the high-frequency frequency range, which are caused in particular by trembling hands. Since the energy of the movement of the active stabilization system increases approximately linearly with the frequency of the perturbing movement, the most energy is consumed in the high-frequency range. If the active stabilization system does not stabilize in this high-frequency range, the energy consumption is significantly reduced.

SUMMARY OF THE INVENTION

The invention is therefore based on the object of refining a long-range optical device of the type mentioned at the beginning, which has a passive stabilization system based on mass inertia, in such a manner that it also allows effective image stabilization in the event of perturbing movements in the low-frequency target frequency range.

According to an aspect, a long-range optical device is provided, comprising at least one optical channel having a housing and an arrangement of optical elements, at least one of the optical elements being movable relative to the housing for image stabilization in the event of perturbing movements of the housing. A first passive stabilization system based on mass inertia for the at least one movable optical element and acting on the at least one movable optical element is configured to generate a first restoring force proportional to the displacement amplitude and a second restoring force proportional to the displacement velocity in the event of displacement of the at least one optical element relative to the housing. The first stabilization system is configured for image stabilization in the event of perturbing movements in a first frequency range. At least one second stabilization system acting on the at least one movable optical element is coupled to the first stabilization system and configured for image stabilization against perturbing movements in at least one second frequency range, the first and the at least one second frequency ranges being at least partially different.

The long-range optical device according to the invention therefore furthermore proceeds from a construction, which has a passive stabilization system based on mass inertia, which generates a restoring force proportional to the displacement amplitude and a restoring force proportional to the displacement velocity. However, in relation to the known long-range optical device, the long-range optical device according to the invention has at least one second stabilization system, which is coupled to the first stabilization system and is designed for image stabilization against perturbing movements in at least one second target frequency range, so that, using the at least one second stabilization system, those perturbing movement frequencies can be filtered out, against which the first passive stabilization system based on mass inertia is not effective or is not sufficiently effective. The first stabilization system can be designed in this case preferably for image stabilization in the event of trembling hands, while the second stabilization system is designed for image stabilization in the event of perturbing movements due to moving grounds (helicopter, vehicle, boat). According to the invention, the at least one second stabilization system does not act independently of the first stabilization system on the movement of the at least one optical element, but rather indirectly via a coupling of the second stabilization system to the first stabilization system.

It is obvious that frequency ranges, in which the at least two stabilization systems are effective or on which they are designed for image stabilization, are not to be understood as frequency ranges in which the at least two stabilization systems are exclusively effective, but rather the stabilization systems are particularly effective with respect to the image stabilization in these frequency ranges. Therefore, frequency ranges in this meaning are always to be understood as target frequency ranges, to which the stabilization systems respond particularly well. This does not preclude the stabilization systems from also unfolding action in other frequency ranges, i.e. in non-target frequency ranges. The one stabilization system is therefore particularly effective in a first target frequency range, for example, in the high-frequency frequency range, and the at least one further stabilization system is particularly effective in at least one second target frequency range, for example, in the low-frequency frequency range.

The long-range optical device according to the invention may be produced more compactly and cost-effectively, in contrast to those having solely active, electronic image stabilization systems.

In a preferred embodiment, one of the at least two frequency ranges has frequencies in the range from approximately 0 Hz to approximately 20 Hz, preferably in the range from approximately 2 Hz to approximately 10 Hz, more preferably in the range from approximately 3 Hz to approximately 7 Hz.

In the specified target frequency ranges, in which at least one of the two stabilization systems is active, excitations which are caused by moving or vibrating grounds can advantageously be effectively damped.

According to a first embodiment variant, the at least one second stabilization system is a passive stabilization system based on mass inertia.

It is advantageous in this case that the at least two stabilization systems can operate overall in a deenergized manner. For the image stabilization, a voltage supply is therefore advantageously not necessary, whereby the long-range optical device manages without a voltage source. It is obvious that more than two passive stabilization systems can also be coupled to one another.

In an embodiment connected to the above-mentioned embodiment, the at least one second stabilization system, in the event of displacement of the at least one optical element relative to the housing, generates a third restoring force proportional to the displacement amplitude and/or a fourth restoring force proportional to the displacement velocity.

In this embodiment, at least three, possibly at least four manipulated variables advantageously result, which can preferably be set independently of one another so that an image stabilization is possible both in the low-frequency target frequency range and also in the high-frequency target frequency range.

In this case, it is furthermore preferable if the at least one optical element is fastened on a first carrier, which is coupled via a first spring joint, which generates the first restoring force, to at least one second carrier so it is movable relative thereto, wherein the at least one second carrier is coupled via at least one second spring joint, which generates the third restoring force, to the housing so it is movable relative thereto.

In this embodiment, the at least two stabilization systems, which are implemented as passive stabilization systems based on mass inertia, are coupled to one another via a spring joint, whereby a coupling between the at least two stabilization systems which is simple to implement is made possible. In this manner, the at least two carriers are connected to one another in the meaning of two coupled vibratory systems.

It is preferable in this case if the first and the at least one second spring joints generate different restoring forces.

In principle and preferably, the two spring joints can be individually set with respect to their spring characteristic.

In a further preferred embodiment, the first stabilization system has a first damping member, which generates the second restoring force, and the at least one second stabilization system has at least one second damping member, which generates the fourth restoring force, wherein the first and the at least one second damping members preferably have different damping behaviors.

It is advantageous in this case that by providing respectively one damping member both for the first stabilization system and also for the at least one second stabilization system, the damping properties or the restoring forces proportional to the displacement velocity can be adapted or set optimally to the desired image stabilization both in the case of perturbing movements in the low-frequency frequency range and also in the high-frequency frequency range.

In this case, it is furthermore preferable if the first damping member acts between the first carrier and the housing and the second damping member acts between the second carrier and the housing.

In this manner, excitations of the first carrier and the second carrier caused by perturbing movements of the housing are damped directly in relation to the housing. It is also conceivable to provide the first or second damping member between the first carrier and the second carrier, however, it can then be more difficult to set a desired damping behavior of the overall system in a manner which can be easily monitored.

In an alternative embodiment variant, the at least one second stabilization system is an active stabilization system based on an electronically controlled actuator system, wherein the actuator system acts on the first stabilization system.

In this embodiment, the long-range optical device has at least two stabilization systems, of which one is passive and one is active. In contrast to the known long-range optical devices, which exclusively have an active stabilization system based on an electronically controlled actuator system for the image stabilization, in the long-range optical device according to the invention, the actuator system does not act directly on the at least one movable optical element or its carrier, but rather it acts on the passive stabilization system based on mass inertia. This can be performed, for example, in that the electronically controlled actuator system acts on the first restoring force proportional to the displacement amplitude, for example, in that the actuator system actively changes the angular position of the optical element or its carrier, or modifies the first restoring force proportional to the displacement amplitude, in that the spring hardness of the spring joint of the passive stabilization system is changed, etc. The actuator system can also act on the passive stabilization system, in that the restoring force proportional to the displacement velocity is actively changed. For example, in the case in which the passive stabilization system has an eddy current damping member, the actuator system can modify the damping parameters of the eddy current brake (magnetic field strength, strength of the induced currents, etc.). An embodiment in which the active stabilization system acts on the passive stabilization system and this overall system is then additionally actively stabilized also falls within the scope of the present embodiment.

In addition there is the possibility, instead of acting on the eddy current damping member or the spring joint, of directly introducing a force into the system, which is not mechanically coupled to the spring joint. Above all, one or more magnetic coils, which act on magnets, also on the magnets of the eddy current damping member, are conceivable here. These do not directly carry out a movement, but rather cause an additional force on the system, whereby the zero position of the mechanical stabilization system is shifted. The active stabilization then tracks the zero position for low frequencies of the perturbing movement and the passive stabilization operates around this zero position.

In this embodiment variant, the first frequency range preferably has frequencies above approximately 20 Hz, preferably above approximately 10 Hz, more preferably above approximately 7 Hz, and the second frequency range has frequencies in the range from approximately 0 Hz to approximately 20 Hz, preferably in the range from approximately 2 Hz to approximately 10 Hz, more preferably in the range from approximately 3 Hz to approximately 7 Hz.

In this embodiment, the first passive stabilization system is accordingly designed for the purpose of causing image stabilization in the event of high-frequency perturbing movements such as trembling hands, while the second stabilization system causes image stabilization in the case of low-frequency perturbing movements such as moving or vibrating grounds.

In this case, it is furthermore preferable if the at least one optical element is fastened on a carrier, which is coupled via a spring joint, which generates the first restoring force, to the housing so it is movable relative thereto, and the actuator system has at least one actuator, which is arranged between the housing and the spring joint, to adjust the spring joint with respect to its position relative to the housing, for image stabilization against perturbing movements in the low-frequency frequency range.

In this embodiment, the actuator system of the active stabilization system moves the spring joint and therefore tilts it relative to the housing. Since, on the other hand, the passive stabilization system hardly reacts to low-frequency perturbing movements, the compensation movements generated by the active stabilization system are transferred by the spring joint to the optical element or its carrier. Such a type of the coupling of the active stabilization system to the passive stabilization system is advantageously simple to implement and does not require a large amount of additional structural space.

In a further preferred embodiment, the passive stabilization system has a damping member, which has at least one first damping element, which is connected to the housing, and at least one second damping element, which is connected to the at least one optical element, and the actuator system adjusts the relative position between the at least one damping element and the at least one second damping element for image stabilization against perturbing movements in the low-frequency frequency range.

This embodiment also represents a structurally simple measure of how the actuator system of the active stabilization system can act on the manipulated variable of restoring force proportional to the displacement velocity, to modify this restoring force so that image stabilization is possible in the case of low-frequency perturbing movements.

Furthermore, it is preferable if the passive stabilization system has a damping member which has at least two damping elements, which are connected to the housing or to the optical element, and the actuator system adjusts the relative position between the at least two damping elements for image stabilization against perturbing movements in the low-frequency frequency range.

While in a preceding embodiment, the actuator system acts between a housing-side damping element and an optic-element-side damping element, in this embodiment, the actuator system acts between two damping elements, which are either both attached on the housing side or are both attached on the optic element side. This embodiment may also be implemented in a structurally simple manner. It is obvious that this embodiment can be combined with the above-mentioned embodiment.

The damping member is preferably configured as an eddy current damping member.

Eddy current damping members have proven to be particularly suitable in passive stabilization systems, because they operate in particular in a contactless and therefore frictionless manner, and because their damping properties are settable in a defined manner by the geometry of the magnets and/or the eddy current plate in a controllable manner.

Furthermore, it is preferable if the at least one second stabilization system has a sensor system for detecting the perturbing movements, and also an analysis unit, which ascertains the displacement amplitudes and displacement velocities from signals of the sensor system, wherein the analysis unit activates the actuator system.

The analysis unit preferably analyzes the perturbing movements detected by the sensor system with respect to their frequency spectrum.

This measure has the advantage that, on the basis of the analysis of the frequency spectrum of the perturbing movements detected by the sensor system, the analysis unit can ascertain whether the detected perturbing movement is a low-frequency perturbing movement or a high-frequency perturbing movement.

This in turn has the advantage, as is provided in a preferred embodiment, that the analysis unit activates the actuator system if the analyzed frequency spectrum of the perturbing movements contains frequencies against which the first stabilization system is essentially ineffective.

The advantage of this measure is that the actuator system does not have to be activated if the analysis of the frequency spectrum of the perturbing movements detected by the sensor system has the result that they are high-frequency perturbing movements such as trembling hands, to which the passive stabilization system already reacts very well, so that the actuator system of the active stabilization system can remain deenergized in this case. In this way, it is advantageously avoided that, in contrast to the known long-range optical devices, which have active stabilization systems, current does not have to flow permanently, which in turn has the advantage that the voltage source (accumulator cell or battery) for the active stabilization system is discharged less rapidly. The analysis unit only activates the actuator system when the analysis of the frequency spectrum has the result that the perturbing movements detected by the sensor system are low-frequency perturbing movements, to react to these low-frequency perturbing movements in the sense of image stabilization.

Furthermore, the sensor system can also have at least one position sensor for detecting the angular position of the carrier of the at least one optical element relative to the housing.

It is obvious that the active stabilization system can also be deactivated by the user for a solely freehand observation without movement or vibrations of the supporting surface. In addition, it is possible to store various stabilization profiles in the analysis unit, so that different stabilization properties can be retrieved in the case of different usage conditions of the long-range optical device. Thus, for example, different stabilization properties can be desired for the usage of the long-range optical device from a boat than for the usage of the long-range optical device in a helicopter.

Further advantages and features result from the following description and the appended drawing.

It is to be understood that the above-mentioned features and the features to be explained hereafter are usable not only in the respective specified combination, but rather also in other combinations or alone, without leaving the scope of the present invention.

BRIEF DESCRIPTION OF THE DRAWINGS

Exemplary embodiments of the invention are shown in the drawing and will be described in greater detail hereafter with reference thereto. In the figures:

FIG. 3 shows the degree of stabilization against perturbing movements as a function of the frequency of the perturbing movements, which can act on the housing of the long-range optical device, if the long-range optical device has a passive stabilization system based on mass inertia, wherein FIG. 3 shows the degree of stabilization only in the portion of the frequency spectrum from 1 Hz to 13 Hz;

DESCRIPTION OF PREFERRED EXEMPLARY EMBODIMENTS

Figure 4:
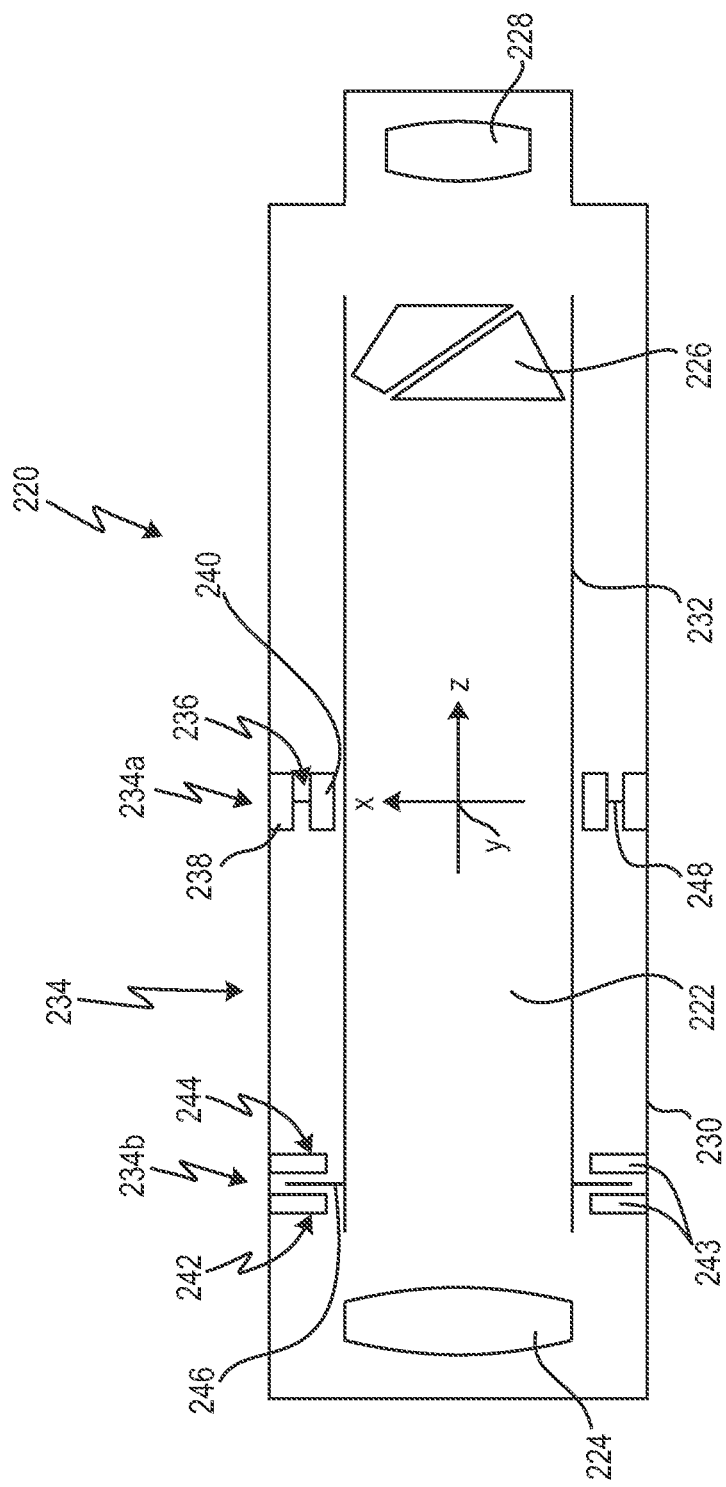
FIG. 4 shows the schematic structure of a long-range optical device having a single passive stabilization system based on mass inertia.

With reference to FIG. 4, firstly a long-range optical device will be described, as is known in the prior art and which is used as a starting point for refinements according to the invention, which will be described later with reference to FIGS. 9 to 15.

The long-range optical device shown with the general reference number 220 has an optical channel 222, in which an arrangement of optical elements 224, 226, and 228 is arranged. The optical elements 224, 226, and 228 are shown in simplified form here, wherein the optical element 224 forms the objective, the optical element 228 forms the eyepiece, and the optical element 226 forms the image inversion system of the long-range optical device 220. In the case in which the long-range optical device 220 is a binocular telescope, in particular a pair of binoculars, it accordingly has two optical channels 222, of which only the one channel is shown here.

The optical channel 222 has a housing 230, in which the arrangement of the optical elements 224, 226, and 228 is accommodated.

For image stabilization in the event of perturbing movements of the housing 230, the optical element 226 (image inversion system) is movable relative to the housing 230. In FIG. 4, a coordinate system xyz is shown in the optical channel 222, wherein z indicates the light propagation axis inside the optical channel 222, x indicates the horizontal axis, and y indicates the vertical axis, wherein the latter extends perpendicularly to the plane of the drawing here. The optical element 226 is mounted so it is pivotable in the housing 230 around the x-axis and the y-axis for image stabilization in this case. The optical element 224 and the optical element 228 are fixed in position with respect to the housing 230.

The movable optical element 226 is fixedly connected to a carrier 232, wherein the carrier 232 is pivotable around the above-mentioned x-axis and the above-mentioned y-axis.

For image stabilization in the event of perturbing movements of the housing 230, i.e. in the event of shaking of the housing 230, the long-range optical device 220 has a passive stabilization system 234 based on mass inertia for the movable optical element 226, wherein the stabilization system 234 has a first member 234a and a second member 234b. The first member 234a generates, in the event of displacement of the optical element 226 relative to the housing 230, a first restoring force (restoring force 208 in FIG. 2) proportional to this displacement amplitude. The first member 234a is implemented as a spring joint 236, which has a degree of rotational freedom around the x-axis and a degree of rotational freedom around the y-axis. The spring joint 236 has, on the one hand, an interface 238 to the housing 230 and an interface 240 to the carrier 232 and therefore to the optical element 226. The first member 234a of the stabilization system 234 therefore forms, according to the mechanical equivalent diagram according to FIG. 2, the bearing 206 and generates the restoring force 208 proportional to the displacement amplitude.

The second member 234b of the stabilization system 234 is implemented as a damping member 242, which generates a second restoring force proportional to the displacement velocity in the event of a displacement of the optical element 226 or the carrier 232 relative to the housing 230. The damping member 238 has an interface 240 to the housing 230, which has damping elements 244, for example, magnets 243, and also an interface 246 to the carrier 232 and therefore to the optical element 226, which has an eddy current plate, for example, which forms an eddy current damping member with the magnets 242.

Figure 2:
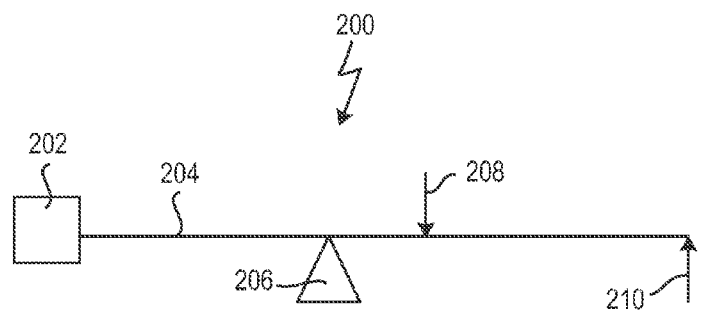
FIG. 2 shows an equivalent diagram of a passive stabilization system based on mass inertia.

In the mechanical equivalent circuit diagram according to FIG. 2, the second member 234b therefore generates the second restoring force 210 proportional to the displacement velocity of the displacement of the optical element 226 relative to the housing 230.

Figure 3:
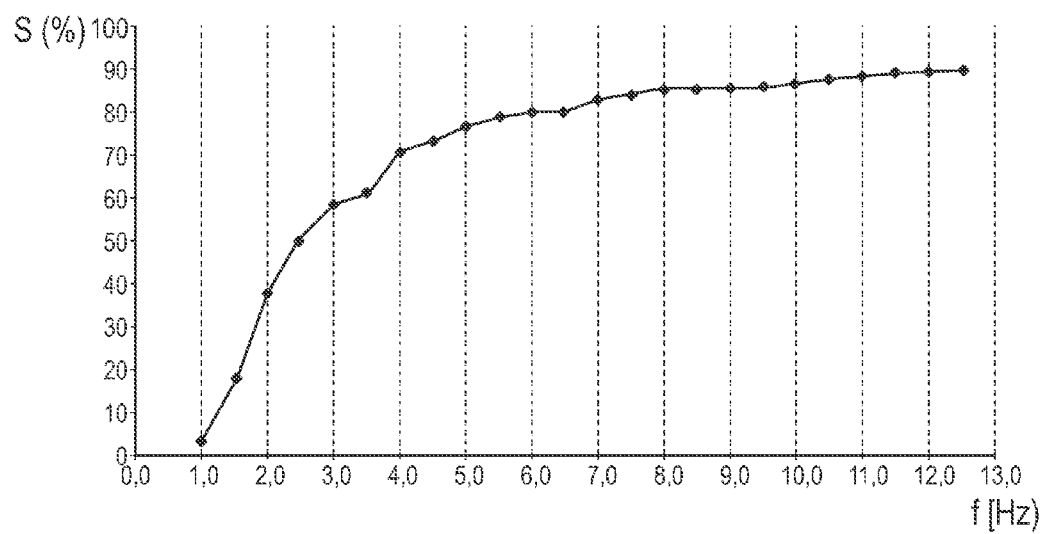

Using the stabilization system 234 of the long-range optical device 220 shown in FIG. 4, a stabilization behavior of the image stabilization in the event of perturbing movements of the housing 230 is obtained as shown in FIG. 3.

According to FIG. 3, the stabilization behavior of the stabilization system 234 is good in the frequency range $f_H$ according to FIG. 1 at frequencies f greater than or equal to approximately 4 Hz, which correspond to the frequencies of trembling hands, while the stabilization behavior significantly decreases in the event of frequencies below approximately 4 Hz, i.e. in the low-frequency frequency range $f_N$ according to FIG. 1. Image stabilization in the event of perturbing movements of the housing 230 in the low-frequency frequency range $f_N$, for example, during use of the long-range optical device 220 on moving grounds, for example, on a boat, in an aircraft, or on a vehicle, is possible only inadequately or not at all using the stabilization system 234.

With reference to the further FIGS. 5 to 14, various exemplary embodiments according to the invention will be described, in which image stabilization is ensured not only in the high-frequency frequency range $f_H$ (trembling hands), but rather also in the low-frequency frequency range $f_N$.

Figure 5:
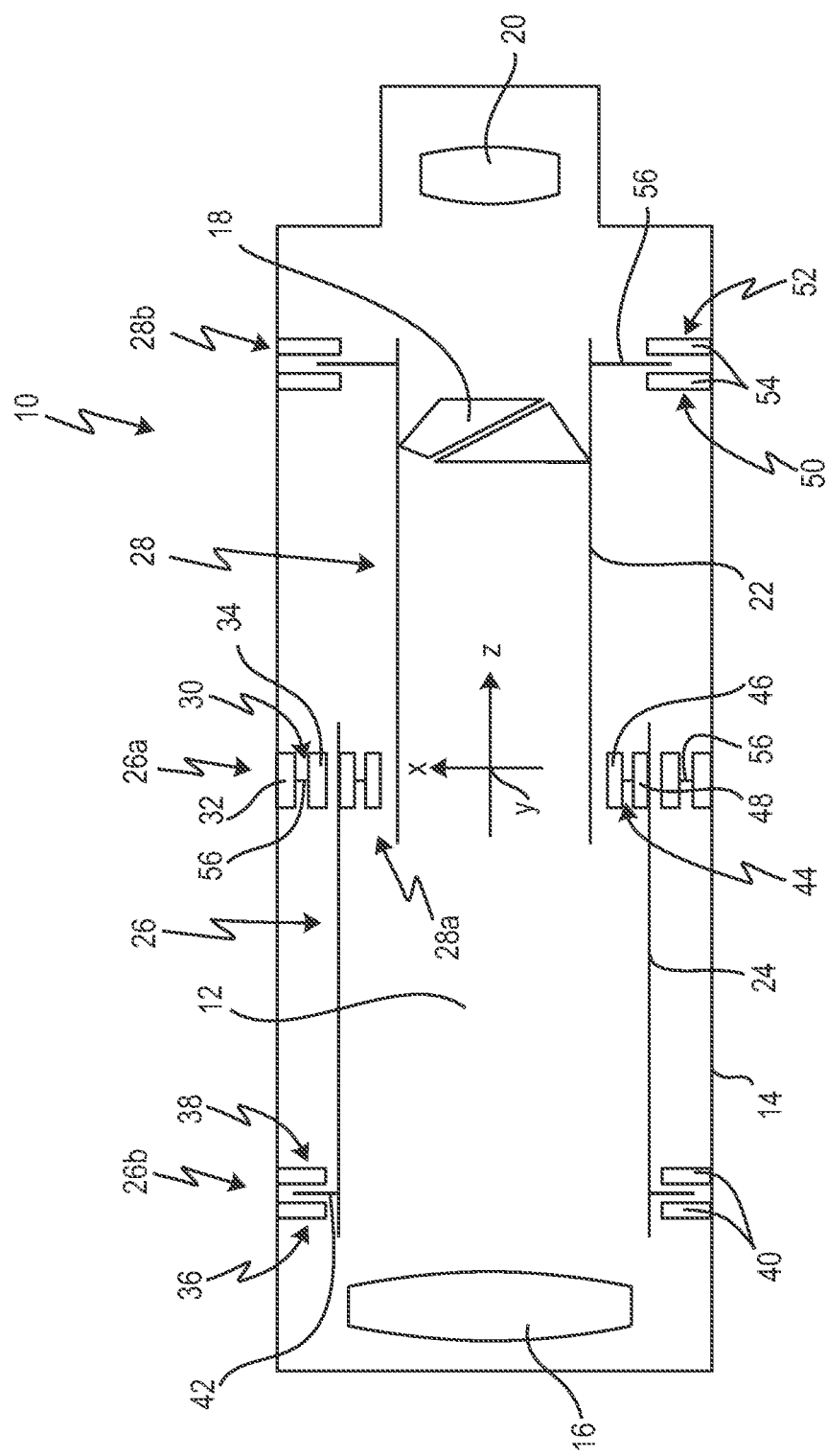
FIG. 5 shows the schematic structure of a long-range optical device, which has two stabilization systems based on mass inertia, which are coupled to one another.
Figure 6:
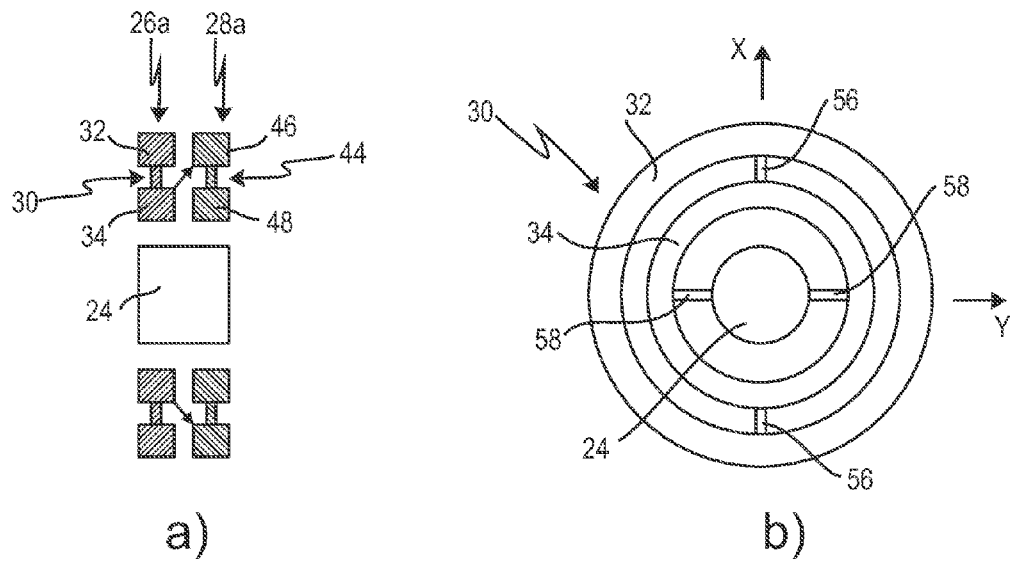
FIGS. 6a) and b) show, in a sectional view in a plane parallel to the light propagation direction (FIG. 6a)) and in a frontal view in the light propagation direction (FIG. 6b)), the schematic diagram of the coupling of two passive stabilization systems based on mass inertia according to FIG. 5 in the region of the mounting of the at least one movable optical element.

FIG. 5 shows an exemplary embodiment of a long-range optical device 10, in which two passive stabilization systems based on mass inertia are coupled to one another. The device 10 has at least one optical channel 12, which has a housing 14 and an arrangement of optical elements 16, 18, and 20. In this case, the optical element 16 represents the objective, the optical element 20 represents the eyepiece, and the optical element 18 represents the image inversion system.

The optical element 18 is, as in the known long-range optical device 220 according to FIG. 4, supported in the housing 14 so it is pivotable around the x-axis and the y-axis, i.e. around the horizontal axis and around the vertical axis, of the long-range optical device 10 and is therefore movable thereto.

The movable optical element 18 (image inversion system) is fastened on a first carrier 22, which is supported in the housing 14 so it is pivotable around the above-mentioned x-axis and the above-mentioned y-axis.

The first carrier 22 is connected to a second carrier 24, which is also supported in the housing 14 so it is pivotable around the x-axis and the y-axis.

The long-range optical device 10 has a first passive stabilization system 26 based on mass inertia and a second, also passive, stabilization system 28 based on mass inertia.

The first stabilization system 26 has a first member 26*a* and a second member 26*b*.

The first member 26*a* is implemented as a spring joint 30 having the above-described two rotational degrees of freedom around the x-axis and the y-axis and has an interface 32 to the housing 14 and an interface 34 to the first carrier 22 and therefore to the optical element 18.

The second member 26*b* of the stabilization system 26 is implemented as a damping member 36 and has an interface to the housing 14, which has damping elements 38, which are implemented as magnets 40, for example, and an interface 42 to the second carrier 24 and, via this, to the first carrier 22 and, via this, to the optical element 18. The interface 42 is implemented in this case, for example, as an eddy current plate, which forms an eddy current damping member with the magnets 40 of the interface 38.

The second stabilization system 28 has a first member 28*a* and a second member 28*b*.

The first member 28*a* has a spring joint 44 having rotational degrees of freedom around the x-axis and the y-axis. The spring joint 44 has an interface 46 to the first carrier 22 and therefore to the movable optical element 18, and also an interface 48 to the second carrier 24 and therefore via the spring joint 30 to the housing 14.

In contrast to the long-range optical device 220, the optical element 18 of the long-range optical device 10 is therefore not directly connected to the housing 14 via the spring joint 44, but rather with the further spring joint 30 interconnected. The two passive stabilization systems 26 and 28 are therefore coupled to one another via the spring joints 30 and 44.

The second member 28*b* of the second stabilization system 28 has a damping member 50 having an interface in the form of two damping elements 52 to the housing 14, which have magnets 54, for example, and an interface 56 to the first carrier 22 and therefore to the optical element 18, wherein the interface 56 has an eddy current plate, for example, which forms an eddy current damping member with the magnets 54.

In an alteration of the exemplary embodiment in FIG. 5, it is also conceivable that the damping member 50 does not act directly between the first carrier 22 and the housing 14, but rather between the first carrier 22 and the second carrier 24, or the damping member 36 acts directly between the second carrier 24 and the housing 14 instead of between the second carrier 24 and the first carrier 22.

The first stabilization system 26 generates, in the event of displacement of the optical element 18 relative to the housing 14, a first restoring force proportional to the displacement amplitude and a second restoring force proportional to the displacement velocity of this displacement, and the second stabilization system 28 generates a third restoring force proportional to the displacement amplitude or to the remaining displacement amplitude of the optical element 18 and/or a fourth restoring force proportional to the displacement velocity or to the remaining displacement velocity of this displacement.

FIG. 6*a*) shows a simplified schematic drawing of the coupling of the two stabilization systems 26 and 28 in the region of their first members 26*a* and 28*a*, which form the supporting of the optical element 18 and generate the restoring forces proportional to the displacement amplitude of the optical element 18. Beginning at the housing-side interface 32 of the spring joint 30, the force flow goes via the interface 34 to the interface 46 and from there to the interface 48, which represents the interface to the optical element 18.

FIG. 6*b*) schematically shows the first member 26*a* in a frontal view in the direction of the light propagation (perpendicular to the plane of the drawing), i.e. in the xy plane having the interfaces 32, 34 and the second carrier 24. FIG. 6*b*) also shows the springs 56 and 58 of the spring joint 30, wherein only the springs 56 are visible in FIG. 5. The springs 56 permit a rotation around the x-axis, and the springs 58 permit a rotation around the y-axis.

The spring joint 44 is constructed accordingly.

Figure 7:
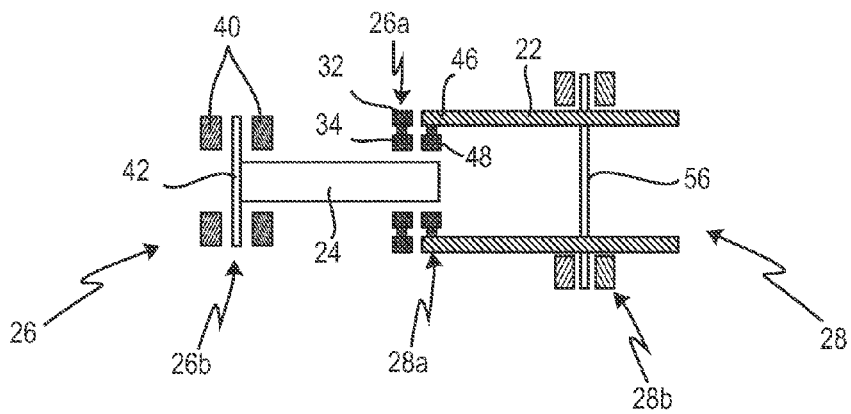
FIG. 7 shows the schematic diagram in longitudinal section parallel to the light propagation direction of the coupling of two passive stabilization systems based on mass inertia, wherein in addition to FIGS. 6a) and b), the two passive stabilization systems based on mass inertia are shown with damping members.

FIG. 7 shows a simplified schematic drawing of the coupling of the stabilization systems 26 and 28 of the long-range optical device 10 with a view corresponding to FIG. 6*a*), wherein the second members 26*b* or 28*b*, respectively, are now also shown.

Spring hardnesses of the spring joint 30, on the one hand, and the spring joint 44, on the other hand, can be implemented or set differently.

The damping characteristics of the damping members 36 and 50 of the two stabilization systems 26 and 28 can also be different.

Figure 8:
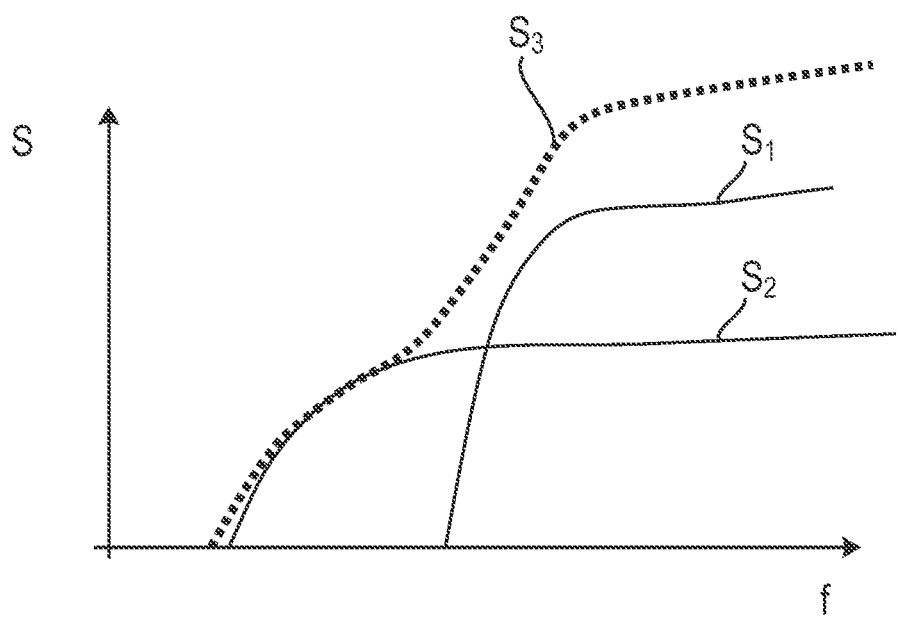
FIG. 8 shows three curves, which illustrate the stabilization behavior of two individual passive stabilization systems based on mass inertia and the stabilization behavior of the overall stabilization system resulting from the combination of two passive stabilization systems based on mass inertia as a function of the frequency, wherein the stabilization behavior is only shown in a portion of the frequency range similar to FIG. 3.

FIG. 8 shows, for the long-range optical device 10, three curves of the degree of stabilization S of the image stabilization as a function of the frequency f of the perturbing movements acting on the housing 14, wherein the curves are only shown in a portion of the entire possible frequency range.

A curve $S_1$ represents the stabilization behavior as a function of the frequency f, which the first stabilization system 26 displays, for example, and a curve $S_2$ correspondingly represents the stabilization behavior as a function of the frequency of the second stabilization system. As can be seen from the curves $S_1$ and $S_2$, the stabilization behavior of the two stabilization systems 26 and 28 was set for image stabilization at various frequency ranges, i.e. the first stabilization system 26 reacts better to high-frequency perturbing movements, for example, and the stabilization system 28 reacts more to low-frequency perturbing movements.

The resulting stabilization behavior of the overall stabilization system made of the first stabilization system 26 and the second stabilization system 28 is shown with a curve $S_3$.

By way of the coupling of two passive stabilization systems 26 and 28 based on mass inertia, image stabilization can therefore be achieved both in the low-frequency frequency range (moving supporting surfaces) and also in the high-frequency frequency range (trembling hands).

It is obvious that more than two passive stabilization systems based on mass inertia can also be coupled to one another.

While in the preceding exemplary embodiment, at least two passive stabilization systems based on mass inertia are coupled to one another, to allow image stabilization in the event of perturbing movements both in the low-frequency range and also in the high-frequency range, exemplary embodiments are described hereafter in which at least one passive stabilization system based on mass inertia is coupled to at least one active stabilization system based on an electronically controlled actuator system, wherein the basic principle is that the active stabilization system acts on the force units of the passive stabilization system.

Figure 9:
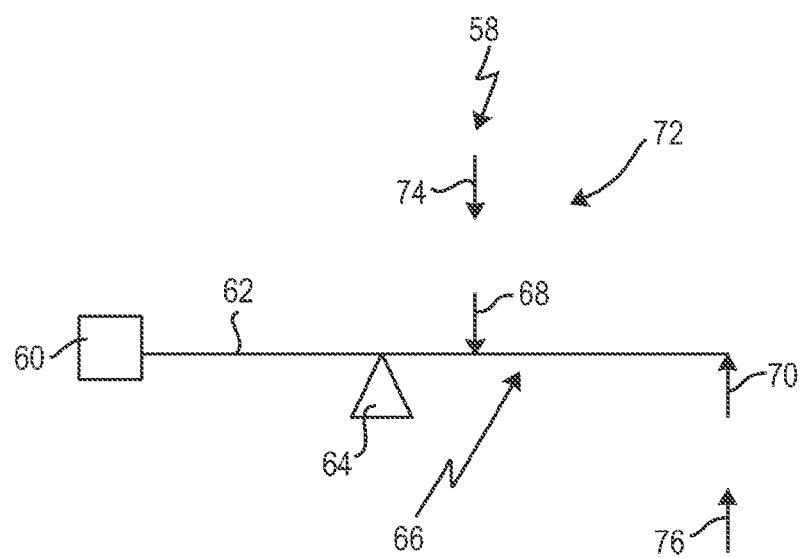
FIG. 9 shows an equivalent diagram of a combination of a passive stabilization system based on mass inertia with an active stabilization system based on an electronically controlled actuator system, which is coupled to the passive stabilization system.

This basic principle is shown in FIG. 9, which builds on the illustration in FIG. 2. FIG. 9 schematically shows an optical element 60, which is movable relative to the housing of the long-range optical device in a long-range optical device 58 for image stabilization in the event of perturbing movements. The optical element 60 is fastened on a carrier 62, which is supported on a bearing 64 so it is pivotable around the above-mentioned x-axis and y-axis, so that the optical element 60 is also pivotable around these two axes. The bearing 64 is part of a passive stabilization system 66 based on mass inertia, which generates a first restoring force 68 proportional to the displacement amplitude of the optical element 60 and a second restoring force 70 proportional to the displacement velocity of the displacement of the optical element 60. In this regard, the long-range optical device 58 is identical to the long-range optical device 200 in FIG. 2 or the long-range optical device 220 in FIG. 4.

However, in contrast to FIGS. 2 and 4, an active stabilization system 72 based on an electronically controlled actuator system is now coupled to the first passive stabilization system 66.

It is indicated by an arrow 74 that the active stabilization system 72 acts on the first restoring force 68 for image stabilization in the event of perturbing movements in the low-frequency frequency range, and an effect of the active stabilization system 72 on the second restoring force 70 portional to the displacement velocity is illustrated by an arrow 76.

Figure 10:
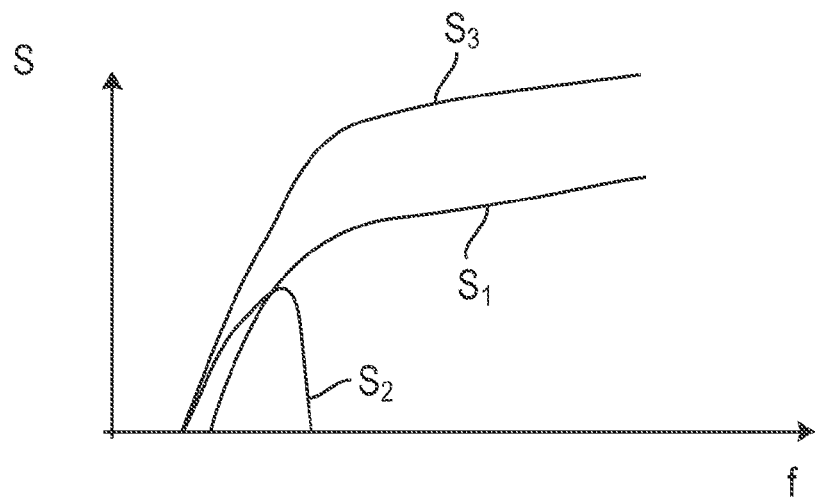
FIG. 10 shows three curves, which illustrate the stabilization behavior of a passive stabilization system based on mass inertia, of an active stabilization system based on an electronically controlled actuator system, and the stabilization behavior of the coupling resulting therefrom as a function of the frequency.

The stabilization behavior of the long-range optical device 58 can be changed, as shown in FIG. 10, by such an effect of the active stabilization system 72 on the passive stabilization system 66.

It is obvious that also only one of the two restoring forces can be actively coupled, that the engagement points of the active system 72 on the passive system 66 can be coupled, or that the force of the active system 72 can be coupled in at a point weighted for both restoring forces 68, 70.

FIG. 10 shows a first curve $S_1$, which illustrates the frequency-dependent degree of stabilization S of the passive stabilization system 66 based on mass inertia. The stabilization behavior or the degree of stabilization S of the active stabilization system 72 as a function of the frequency f is illustrated by a curve $S_2$. As is clear from FIG. 10, the active stabilization system 72 is essentially active in the event of perturbing movements in the low-frequency frequency range. The overall stabilization behavior of the combination of passive stabilization system and active stabilization system is now illustrated with a curve $S_3$, wherein it results on the basis of the profile of the curve $S_3$ that, in contrast to the passive stabilization system alone, image stabilization is now also additionally caused in the low-frequency frequency range.

The effect of the active stabilization system 66 based on an electronically controlled actuator system on the passive stabilization system can be of various natures. The term "actuator system" is to be understood generally in this regard.

It is thus conceivable, for example, that the active stabilization system 66 acts on the first restoring force proportional to the displacement amplitude, which is generated by the passive stabilization system 66, in such a manner that the actuator system modifies the angular position of the carrier 62, and/or modifies the restoring force 68 in that the spring constant of the spring joint of the passive stabilization system is modified by pre-tension, etc. An effect of the active stabilization system 72 on the second restoring force 70 proportional to the displacement velocity, which is generated by the passive stabilization system, can act in a modification of the eddy current damping member 238 in FIG. 4 by geometrical variation, for example, of the spacing of the magnets 242, the position of the metal plate 244, the position of the magnets 242, by influencing the material of the magnets 242, or by induction, etc., as described hereafter. The embodiments described hereafter are refinements of the long-range optical device 220 in FIG. 4 with a coupling of an active stabilization system to the already provided passive stabilization system 234.

Figure 11:
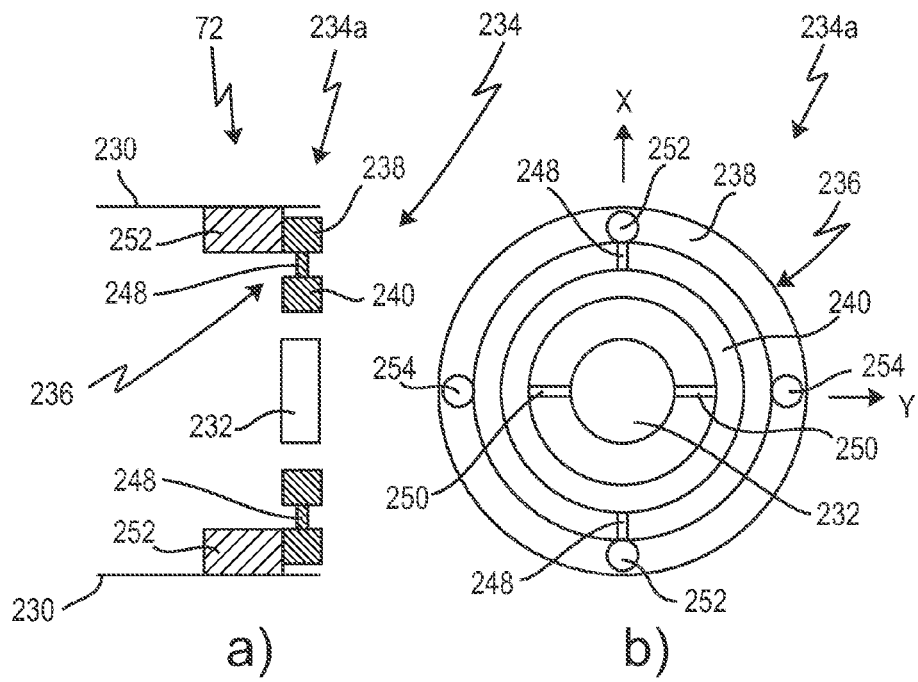
FIGS. 11a) and b) show a schematic diagram of a coupling of a passive stabilization system based on mass inertia to an active stabilization system based on an electronically controlled actuator system in the region of the mounting of the at least one movable optical element, wherein FIG. 11a) shows a longitudinal section along the light propagation direction and FIG. 11b) shows a frontal view in the light propagation direction.

With reference to FIG. 4, in conjunction with FIGS. 11a) and b), an exemplary embodiment of a coupling of an active stabilization system to a passive stabilization system will be described, wherein those parts which are comparable or identical to parts of the long-range optical device 220 in FIG. 4 are provided with the same reference signs in FIG. 11 as in FIG. 4.

FIG. 11a) shows the first member 234a of the passive stabilization system 234. As already described above, the first member 234a of the passive stabilization system 234 is implemented as a spring joint, wherein FIG. 11a) shows the spring joint in section parallel to the z-axis in FIG. 4 and FIG. 11b) shows the spring joint 236 in a frontal view in the xy plane.

FIG. 11b) also shows springs 248 and 250, which define the two rotational degrees of freedom of the spring joint 236 around the x-axis and the y-axis. Only the springs 248 are visible in FIG. 11a) and in FIG. 4 corresponding to the longitudinal sectional view.

While in the long-range optical device 220 in FIG. 4, the spring joint 236 is coupled via the interface 238 directly to the housing 230, the spring joint 236 is connected according to FIGS. 11a) and b) to the housing 230 via actuators 252 and 254.

The actuators 252 and 254 are arranged between the housing 230 and the spring joint 236, wherein the actuators 252 and 254 adjust the spring joint with respect to its position relative to the housing 230 for image stabilization against perturbing movements in the low-frequency frequency range.

The actuators 252 are used in this case to adjust the spring joint 236 relative to the housing 230 around the x-axis, and the actuators 254 are accordingly used to adjust the spring joint 236 relative to the housing 230 around the y-axis.

For image stabilization in the event of perturbing movements in the low-frequency range, the spring joint 236 is therefore actively moved and tilted relative to the housing 230. Since the first passive stabilization system 234 hardly reacts to low-frequency perturbing movements, the compensation movements generated by the active stabilization system 72 are transferred from the spring joint 236 to the carrier 232 and therefore to the optical element 226 (see FIG. 4).

FIGS. 12a) and b) now show how the active stabilization system 72 acts on the second member 234b of the passive stabilization system 234, in order to change the second restoring force proportional to the displacement velocity in the event of a displacement of the optical element 226 relative to the housing 230, to achieve image stabilization in the event of perturbing movements in the low-frequency frequency range.

Those parts which are comparable or identical to parts of the long-range optical device 220 in FIG. 4 were provided with the same reference signs in FIGS. 12a) and b).

While in the long-range optical device 220 in FIG. 4, the interface 246, which is implemented as an eddy current plate, is rigidly connected to the carrier 232, the interface 246, also in the form of an eddy current plate, is not connected to the carrier 232 rigidly, but rather via an actuator 258 of an actuator system of the active stabilization system 72. This coupling of the active stabilization system 72 to the second member 234b of the passive stabilization system 234 allows active control of the relative movement between the eddy current plate 246 and the magnets 243. The relative movement between the eddy current plate 246 and the magnets 243 can be increased or decreased in relation to the eddy current plate 246 rigidly coupled to the carrier 232, whereby the damping caused by the damping member 242 of the passive stabilization system 234 can be increased or decreased.

Figure 12:
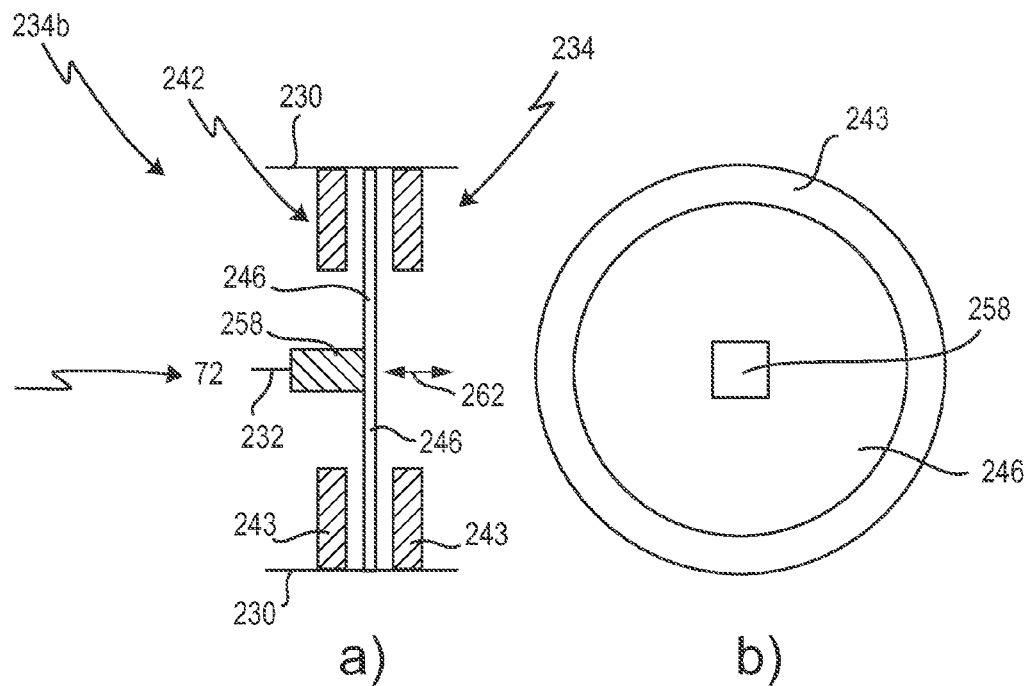
FIGS. 12a) and b) show a further schematic diagram of a coupling of a passive stabilization system based on mass inertia to an active stabilization system based on an electronically controlled actuator system in the region of the damping member of the passive stabilization system, wherein FIG. 12a) shows a view corresponding to FIG. 11a) and FIG. 12b) shows a view corresponding to FIG. 11b)

FIGS. 13a) and b) show a further exemplary embodiment, which can be used in combination with the exemplary embodiment in FIG. 12 or alone, and in which the actuator system of the active stabilization system has at least one actuator 260, which is arranged between the magnets 243 of the second member 234b of the passive stabilization system 234 and the housing 230, wherein the relative movement between the magnets 243 and the metal plate 246 can be actively controlled via the at least one actuator 260, similarly to the exemplary embodiment in FIG. 12.

While in FIG. 12a), a possible movement direction of the metal plate 246, which is initiated by the actuator 258, is illustrated by a double arrow 262, a double arrow 264 in FIG. 13a) illustrates the movement of the magnets 243 relative to the housing 230 caused by the at least one actuator 260.

Figure 13:
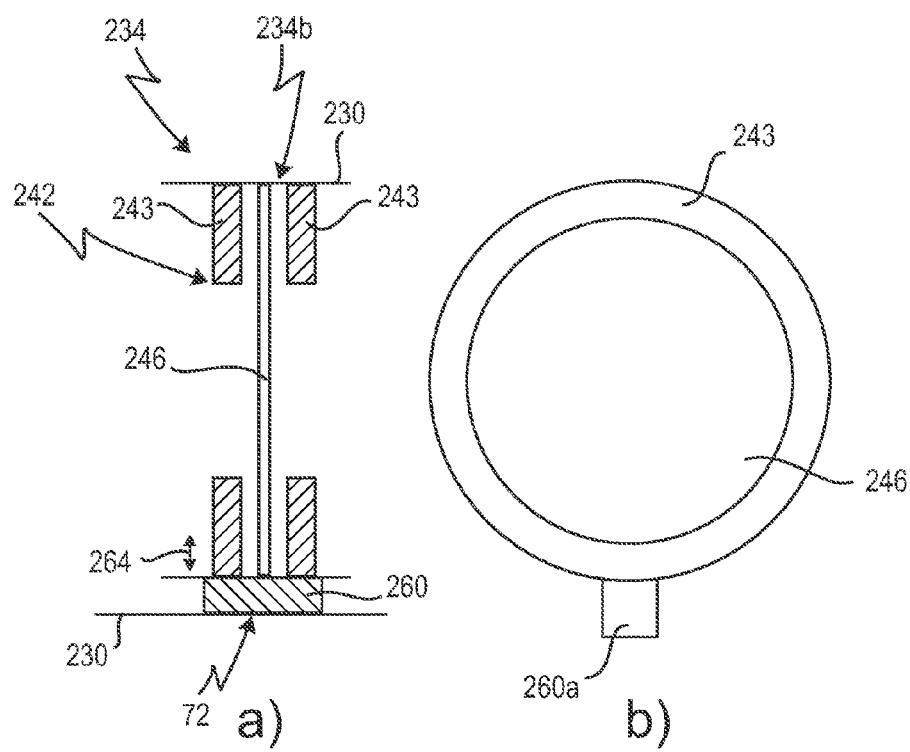
FIG. 13 shows a further schematic diagram of a coupling of passive and active stabilization systems in the region of the damping member a) and b) of the passive stabilization system in two views corresponding to FIGS. 11a) and b)
Figure 14:
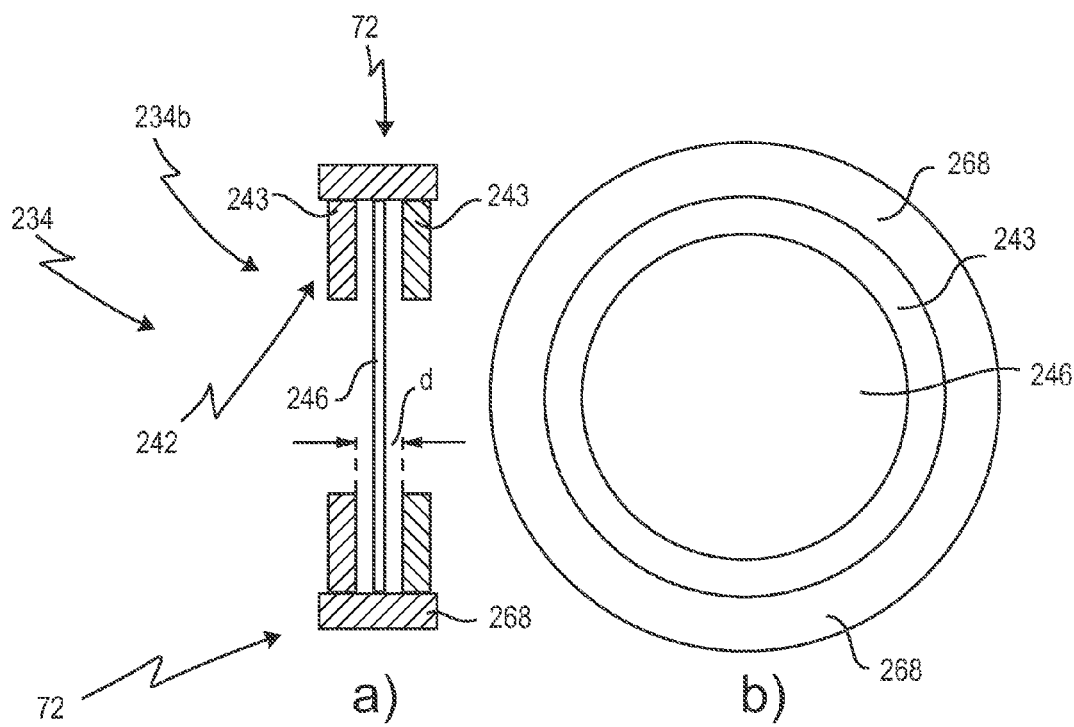
FIG. 14 shows still a further schematic diagram of a coupling of passive and active stabilization systems in the region of the damping member of the passive stabilization system in two views corresponding to FIGS. 11a) and b)

In addition to the embodiments according to FIGS. 12 and 13 or alternatively thereto, the active stabilization system 72 can have an actuator system having at least one actuator 268, which actively changes a spacing d between the magnets 243 of the damping member 242 of the passive stabilization system 234, in that the actuator 268 moves the magnets 243 toward or away from one another. The magnetic field density and therefore the damping of the damping member 242 is changed by this movement.

The active stabilization system 72 based on an electronic control actuator system has a sensor system for detecting the perturbing movements acting on the housing 230, and also an analysis unit, which ascertains the detected displacement amplitudes and displacement velocities from signals of the sensor system, wherein the analysis unit then activates the actuator system, i.e. the actuators 252, 254, 258, 260, and/or 268, to cause image stabilization in the low-frequency frequency range.

Figure 15:
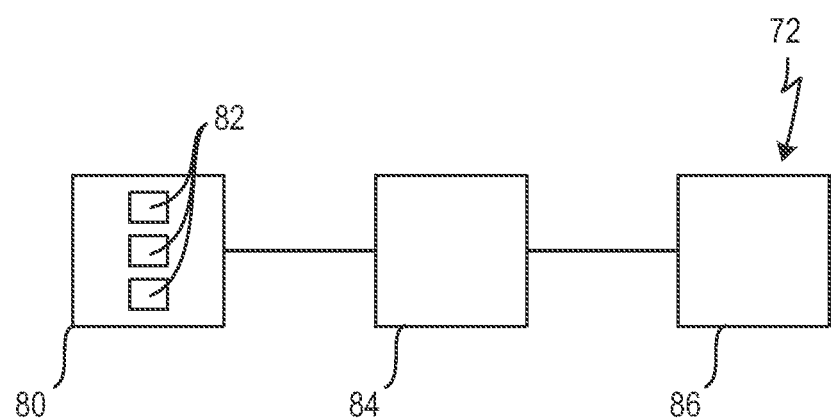
FIG. 15 shows a block diagram of an active stabilization system.

This state of affairs is shown in FIG. 15. A sensor system 80, which has, for example, one or more sensors 82 connected to the housing 230, detects movements of the housing 230, also including perturbing movements. The signals generated by the sensor system 80 are fed into an analysis unit 84, which ascertains from the signals of the sensor system 80 the detected displacement amplitudes and displacement velocities, which result from the movements of the housing 230. The analysis unit 84 then activates the actuator system 86 of the active stabilization system 72 accordingly for image stabilization.

Figure 1:
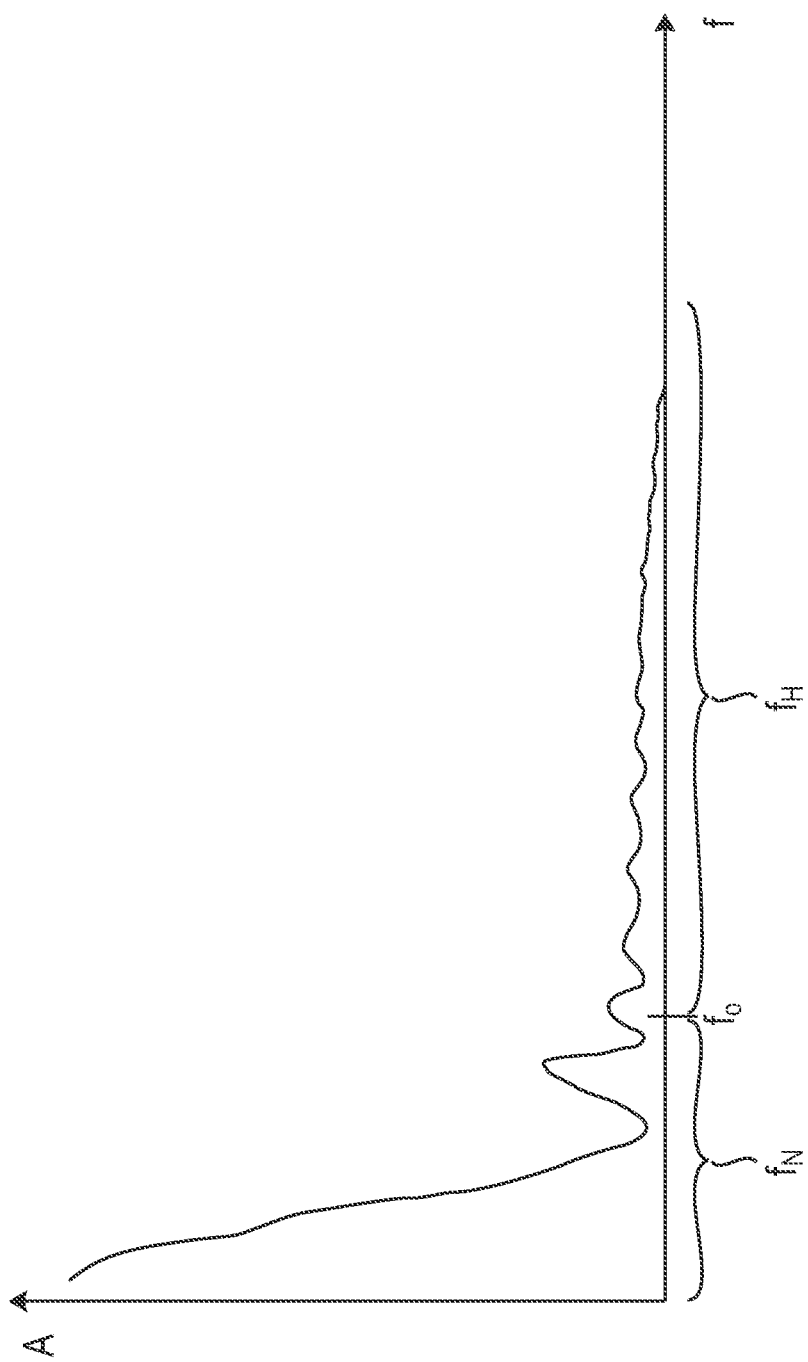
FIG. 1 shows a curve, which shows amplitudes of perturbing movements, which can act on a housing of a long-range optical device, as a function of the frequency.

The analysis unit 84 is designed in particular for the purpose of analyzing the perturbing movements detected by the sensor system 80 with respect to their frequency spectrum (see FIG. 1). The analysis unit 84 then activates the actuator system 86 if the frequency spectrum of the perturbing movements, which is analyzed by the analysis unit 84, contains frequencies, against which the passive stabilization system 234 is essentially ineffective. In this manner, the active stabilization system 72 does not have to be permanently active or voltage does not have to be permanently applied to the actuator system 86, but rather only in the case that the analysis unit 84 detects perturbing movements, the frequencies of which at least also lie in the low-frequency frequency range.

What is claimed is:

1. A long-range optical device, comprising:
at least one optical channel having a housing and an arrangement of optical elements;
at least one of the optical elements being movable relative to the housing for image stabilization in the event of perturbing movements of the housing;
a first passive stabilization system based on mass inertia and acting on the at least one movable optical element, the first passive stabilization system being configured to generate a first restoring force proportional to the displacement amplitude and a second restoring force proportional to the displacement velocity in the event of displacement of the at least one optical element relative to the housing, the first passive stabilization system being configured for image stabilization in the event of perturbing movements in a first frequency range;
at least one second stabilization system acting on the at least one movable optical element, the at least one second stabilization system coupled to the first stabilization system and configured for image stabilization against perturbing movements in at least one second frequency range, wherein the at least one second stabilization system is an active stabilization system based on an electronically controlled actuator system, wherein the actuator system acts on the first stabilization system, the first and the at least one second frequency ranges being at least partially different;
a carrier, the at least one optical element being fastened on the carrier; and
a spring joint for movably coupling the carrier to the housing, the spring joint generating the first restoring force, the actuator system having at least one actuator arranged between the housing and the spring joint, to adjust the spring joint with respect to its position relative to the housing for image stabilization against perturbing movements in the low-frequency frequency range.

2. The device of claim 1, wherein one of the first and at least one second frequency ranges has frequencies in the range from approximately 0 Hz to approximately 20 Hz.

3. The device of claim 1, wherein one of the first and at least one second frequency ranges has frequencies in the range from approximately 2 Hz to approximately 10 Hz.

4. The device of claim 1, wherein one of the first and at least one second frequency ranges has frequencies in the range from approximately 3 Hz to approximately 7 Hz.

5. The device of claim 1, wherein the first frequency range has frequencies above approximately 20 Hz, and the second frequency range has frequencies in the range from approximately 0 Hz to approximately 20 Hz.

6. The device of claim 1, wherein the first frequency range has frequencies above approximately 10 Hz, and the second frequency range has frequencies in the range from approximately 2 Hz to approximately 10 Hz.

7. The device of claim 1, wherein the first frequency range has frequencies above approximately 7 Hz, and the second frequency range has frequencies in the range from approximately 3 Hz to approximately 7 Hz.

8. A long-range optical device, comprising:
at least one optical channel having a housing and an arrangement of optical elements;
at least one of the optical elements being movable relative to the housing for image stabilization in the event of perturbing movements of the housing;
a first passive stabilization system based on mass inertia and acting on the at least one movable optical element, the first passive stabilization system being configured to generate a first restoring force proportional to the displacement amplitude and a second restoring force proportional to the displacement velocity in the event of displacement of the at least one optical element relative to the housing, the first passive stabilization system being configured for image stabilization in the event of perturbing movements in a first frequency range;
at least one second stabilization system acting on the at least one movable optical element, the at least one second stabilization system coupled to the first stabilization system and configured for image stabilization against perturbing movements in at least one second frequency range, wherein the at least one second stabilization system is an active stabilization system based on an electronically controlled actuator system, wherein the actuator system acts on the first stabilization system, the first and the at least one second frequency ranges being at least partially different, wherein the first passive stabilization system has a damping member having at least one first damping element connected to the housing, and at least one second damping element connected to the at least one optical element, the actuator system being configured to adjust the relative position between the at least one first damping element and the at least one second damping element for image stabilization against perturbing movements in the low-frequency frequency range.

9. The device of claim 8, wherein the damping member is configured as an eddy current damping member.

10. The device of claim 8, wherein one of the first and at least one second frequency ranges has frequencies in the range from approximately 0 Hz to approximately 20 Hz.

11. The device of claim 8, wherein one of the first and at least one second frequency ranges has frequencies in the range from approximately 2 Hz to approximately 10 Hz.

12. The device of claim 8, wherein one of the first and at least one second frequency ranges has frequencies in the range from approximately 3 Hz to approximately 7 Hz.

13. A long-range optical device, comprising:
at least one optical channel having a housing and an arrangement of optical elements;
at least one of the optical elements being movable relative to the housing for image stabilization in the event of perturbing movements of the housing;
a first passive stabilization system based on mass inertia and acting on the at least one movable optical element, the first passive stabilization system being configured to generate a first restoring force proportional to the displacement amplitude and a second restoring force proportional to the displacement velocity in the event of displacement of the at least one optical element relative to the housing, the first passive stabilization system being configured for image stabilization in the event of perturbing movements in a first frequency range;
at least one second stabilization system acting on the at least one movable optical element, the at least one second stabilization system coupled to the first stabilization system and configured for image stabilization against perturbing movements in at least one second frequency range, wherein the at least one second stabilization system is an active stabilization system based on an electronically controlled actuator system, wherein the actuator system acts on the first stabilization system, the first and the at least one second frequency ranges being at least partially different, wherein the first passive stabilization system has a damping member having at least two damping elements connected to the housing or to the optical element, the actuator system being configured to adjust the relative position between the at least two damping elements for image stabilization against perturbing movements in the low-frequency frequency range.

14. The device of claim 13, wherein the damping member is configured as an eddy current damping member.

15. The device of claim 13, wherein one of the first and at least one second frequency ranges has frequencies in the range from approximately 0 Hz to approximately 20 Hz.

16. The device of claim 13, wherein one of the first and at least one second frequency ranges has frequencies in the range from approximately 2 Hz to approximately 10 Hz.

17. The device of claim 13, wherein one of the first and at least one second frequency ranges has frequencies in the range from approximately 3 Hz to approximately 7 Hz.

18. A long-range optical device, comprising:
at least one optical channel having a housing and an arrangement of optical elements;
at least one of the optical elements being movable relative to the housing for image stabilization in the event of perturbing movements of the housing;
a first passive stabilization system based on mass inertia and acting on the at least one movable optical element, the first passive stabilization system being configured to generate a first restoring force proportional to the displacement amplitude and a second restoring force proportional to the displacement velocity in the event of displacement of the at least one optical element relative to the housing, the first passive stabilization system being configured for image stabilization in the event of perturbing movements in a first frequency range;

at least one second stabilization system acting on the at least one movable optical element, the at least one second stabilization system coupled to the first stabilization system and configured for image stabilization against perturbing movements in at least one second frequency range, wherein the at least one second stabilization system is an active stabilization system based on an electronically controlled actuator system, wherein the actuator system acts on the first stabilization system, the first and the at least one second frequency ranges being at least partially different, wherein the at least one second stabilization system has a sensor system for detecting the perturbing movements and an analysis unit configured to ascertain the displacement amplitudes and displacement velocities from signals of the sensor system, the analysis unit being further configured to activate the actuator system.

19. The device of claim 18, wherein the analysis unit is configured to analyze the perturbing movements detected by the sensor system with respect to their frequency spectrum.

20. The device of claim 18, wherein one of the first and at least one second frequency ranges has frequencies in the range from approximately 0 Hz to approximately 20 Hz.

21. The device of claim 18, wherein one of the first and at least one second frequency ranges has frequencies in the range from approximately 2 Hz to approximately 10 Hz.

22. The device of claim 18, wherein one of the first and at least one second frequency ranges has frequencies in the range from approximately 3 Hz to approximately 7 Hz.

23. The device of claim 19, wherein the analysis unit is configured to activate the actuator system if the analyzed frequency spectrum of the perturbing movements contains frequencies against which the first stabilization system is essentially ineffective.

* * * * *